(12) United States Patent
Li et al.

(10) Patent No.: US 8,553,642 B2
(45) Date of Patent: Oct. 8, 2013

(54) METHOD FOR SOLVING NON-CONTROLLABILITY OF TERMINAL'S POWER SPECTRUM DENSITY IN OFDMA SYSTEM

(75) Inventors: Qinji Li, Guangdong Province (CN); Gang Qiu, Guangdong Province (CN); Shaogui Lu, Guangdong Province (CN); Ying Liu, Guangdong Province (CN); Xiangyu Liu, Guangdong Province (CN); Dengkui Zhu, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 948 days.

(21) Appl. No.: 12/667,799

(22) PCT Filed: Dec. 3, 2007

(86) PCT No.: PCT/CN2007/003420
§ 371 (c)(1),
(2), (4) Date: Jan. 5, 2010

(87) PCT Pub. No.: WO2009/003330
PCT Pub. Date: Jan. 8, 2009

(65) Prior Publication Data
US 2010/0215017 A1  Aug. 26, 2010

(30) Foreign Application Priority Data
Jul. 5, 2007 (CN) .......................... 2007 1 0075823

(51) Int. Cl.
*H04W 72/04* (2009.01)
(52) U.S. Cl.
USPC .......................................... 370/330; 370/206
(58) Field of Classification Search
USPC ................. 370/208, 206, 311, 468, 478, 330; 455/13.4, 127.1
See application file for complete search history.

(56) References Cited

U.S. PATENT DOCUMENTS

| | | | |
|---|---|---|---|
| 7,586,990 B2 * | 9/2009 | Subramanian et al. | 375/260 |
| 8,259,823 B2 * | 9/2012 | Bitran et al. | 375/260 |
| 2006/0078059 A1 * | 4/2006 | Ok et al. | 375/260 |

FOREIGN PATENT DOCUMENTS

| | | |
|---|---|---|
| CN | 1741412 A | 3/2006 |
| CN | 1823278 A | 8/2006 |

(Continued)

OTHER PUBLICATIONS

International Search Report issued in International Application No. PCT/CN2007/003420 dated Apr. 10, 2008.

(Continued)

*Primary Examiner* — Thai Nguyen
(74) *Attorney, Agent, or Firm* — Venable LLP; Michael A. Gollin; Robert S. Babayi

(57) ABSTRACT

The present invention discloses a method for solving non-controllability of terminal's power spectrum density in OFDMA system. It considers the problem of non-controllability of terminal's carrier transmit power resulting from the indeterminacy of carrier number allocation to the terminal in the OFDMA system which is solved by introducing the maximum carrier number that can be allocated to the terminal by combing AMC, the power control and the dispatching. By applying the present invention, the carrier power of the terminal can be best controlled by the system, it is most possible for the terminal to transmit power on carrier completely according to a set value, while it is greatly reduced the possibility that the terminal's power spectrum density is suddenly decreased out of control, which is caused by the summation of carrier powers in the set value exceeding the maximum total transmit power. Moreover, it is avoided occurrence of a large amount of error codes in that condition and the waste of power resources resulting from the excessive restriction on the carrier power.

9 Claims, 4 Drawing Sheets

(56) References Cited

FOREIGN PATENT DOCUMENTS

| | | |
|---|---|---|
| CN | 1930799 A | 3/2007 |
| JP | 2006-529075 A | 12/2006 |
| JP | 2007-028637 A | 2/2007 |
| JP | 2007-124662 A | 5/2007 |
| WO | WO-2005/020489 A1 | 3/2005 |
| WO | WO-2007/066902 A2 | 6/2007 |

OTHER PUBLICATIONS

Li et al., "Adaptive resource allocation for beamforming-based OFDMA systems," Chinese Journal of Radio Science, 2007, vol. 22, No. 1, pp. 73-78.

Office Action issued in Japanese Application No. 2010-513609 dated May 18, 2013.

* cited by examiner

METHOD FOR SOLVING NON-CONTROLLABILITY OF TERMINAL'S POWER SPECTRUM DENSITY IN OFDMA SYSTEM

TECHNICAL FIELD

The present invention relates to a terminal power control method in communication field, in particular, relates to a method for avoiding the problem that the terminal's power spectrum is suddenly decreased out of control or the carrier power is excessively restricted due to the indeterminacy of channel allocation in OFDMA (Orthogonal Frequency Division Multiple Access) system.

BACKGROUND OF THE INVENTION

In recent years, OFDM technology has become the mainstream in wireless communication physical layer technologies, due to its effective resistance to multi-path interference and narrow-band interference, high spectral efficiency and high transmission rate. OFDM is adopted as the physical layer technologies for providing multi address access (OFDMA) no matter in subsequent evolution of 3G (such as LTE) or in wireless broadband access technologies popular at present (such as IEEE 802.16 and IEEE 802.20).

In OFDMA system, it is divided as plural OFDM symbols in time domain, while it is divided as plural sub-channels in frequency domain, and each sub-channel is a set of a group of sub-carriers. Generally, time frequency area formed by crossing of one sub-channel and one or several symbols is called slot, which is the smallest allocation unit of OFDMA system. In such way, the physical layer resources of OFDMA frame can be logically represented by a two-dimensional rectangular table formed by slot and sub-channel. As shown in FIG. 1, a grid is a slot and the physical layer resources allocated for the terminal are resource blocks in the unit of slot, which are generally blocks similar to rectangle (such as IEEE 802.16) with a two-dimensional time-frequency structure. According to different service requirements and different modulation coding methods determined by AMC (Adaptive Modulation and Coding) performed upon the channel conditions, and the dispatching of resource blocks allocated thereto in different times may greatly differ, that is, the number of carriers allocated to the terminal may differ after each dispatching, which may lead to great change of carrier number the terminal has in different times.

As in OFDMA system the terminal usually has the restriction on maximum total transmit power, it only needs to satisfy that the summation of transmit power of all carriers allocated at present is smaller than or equal to the maximum total transmit power restriction, in order to save power resources, increase uplink coverage and enhance channelized gain. At present most of products adopt the above method. Additionally, the restriction of maximum total transmit power restriction of the terminal can also be allocated to the most possible carriers number of the terminal as the of the carrier maximum transmit power restriction, which however will lose channelized gain and seriously waste power resources.

When the power constraint is merely to require the power summation of carriers allocated at present is smaller than the total transmit power of the terminal, following problems exist: in OFDMA system, after AMC determines the modulation coding method according to channel conditions, and power control determines the carrier's transmit power according to the modulation coding method, the total transmit power of the terminal will change significantly resulting from the significantly change of carrier number allocated to the terminal by dispatching. The traditional method at present is as follows: AMC and power control are performed before the dispatching and they are conducted separately. The object of AMC and power control is each carrier. As stated in the above, when the upper limit of carrier's transmit power is used in the power control to restrict the uplink transmit power, the maximum transmit power of the carrier can only be determined according to bandwidth allocation condition of the previous one frame's or prior dispatching. As dispatching has not been performed at this moment, it is unknown how much bandwidth will be allocated to MS at this time. The bandwidth allocated to the terminal by the dispatching according to modulation and coding method and QoS (Quality of Service) may either be less or more than the previous one frame. If it is less than the previous allocation, excessive restriction may be applied to carrier power in the power control, wasting the power resources; if it is more than the previous allocation, the carrier's maximum power restriction in the power control will become meaningless, where, the calculated carrier transmit power summation may be greater than the maximum total transmit power of the terminal, however the terminal actually can not transmit so much power, resulting in that the terminal allocates all the power to all its carriers, however, carrier power is still much smaller than the set value and power spectrum density is suddenly decreased without control, that is, carrier power is suddenly decreased without control. In this way, the carrier's actual transmit power will be much smaller than the carrier transmit power determined in the power control and the obtained SNR (Signal to Noise Ratio) will be small, which can not meet the demand of its modulation coding method determined in AMC and finally leads to a large amount of error codes. For example, in OFDMA system of IEEE 802.16e with bandwidth of 10 MHz and FFT of 1024 point, each sub-channel of uplink comprises 24 physical sub-carriers, the maximum total transmit power of one terminal is $P_{MAX}$, the modulation coding method determined by AMC in the last time is $MC_1$, the carrier transmit power determined in power control is $P_2$, the bandwidth allocated in the dispatching is $N_1$ sub-channels, single carrier power is $P_1$ satisfying $N_1 \times 24 \times P_1 \leq P_{MAX}$; the modulation coding method is first determined to be $MC_2$ according to SNR in AMC this time, power control determines the carrier's transmit power to be $P_2$. To guarantee the validity of this power, the magnitude of the carrier power will be restricted in power control to make sure that the summation of carrier power is smaller than the maximum transmit power of the terminal. However, the dispatching has not been performed at this moment, the system does not know how much bandwidth is allocated to the terminal at this time and only can perform the maximum power restriction according to bandwidth allocation of the last time, therefore the maximum power restriction here becomes meaningless. Thereafter, the dispatching allocates the bandwidth of $N_2$ sub-channels, wherein $N_2$ may be either greater or smaller than $N_1$, and at this moment it is possible $N_2 \times 24 \times P_2 \leq P_{MAX}$ or $N_2 \times 24 \times P_2 \geq P_{MAX}$. In the case of $N_2 \times 24 \times P_2 \leq P_{MAX}$, it is possible that the terminal's maximum transmit power restriction has no influence on carrier power or that it restricts terminal carrier's transmit power when be as the carrier's maximum power restriction in power control, leading to that the terminal requiring higher power can not obtain the higher transmit power that would have been obtained and rendering waste of power resources. In the case of $N_2 \times 24 \times P_2 > P_{MAX}$, the terminal actually can not transmit the carrier's transmit power set in the power control and the carrier's transmit power will suddenly become lower than the value set in the power control, which leads to that SNR (SNR related here specially refers to ratio of signal to power of interference or noise) can not satisfy the requirement of modulation coding method previously set in the AMC and a large amount of error codes occur. In an easier condition, after two dispatching, the modulation coding method and carrier's transmit power set are the same, while the bandwidth allocations are different, that is, $MC_1=MC_2$, $P_1=P_2$ and $N_1$ is not equal to $N_2$. There is no problem in case of $N_2<N_1$ and $N_2 \times 24 \times P_2 \leq P_{MAX}$, however, if $N_1<N_2$, $N_2 \times 24 \times P_2 > P_{MAX}$ may be occur and the carrier's actual transmit power of the terminal must be smaller than $P_2$. However, in power control $P_2$ is determined according to modulation coding method, in this way, SNR can not satisfy the requirement of modulation coding method determined previously and a large amount of error codes will occur.

Time-Frequency two-dimensional resources bring about many advantages to OFDMA, such as flexibility, but also non-controllability and waste of resources. The existing systems all adopt traditional method that AMC is first performed, then power control and at last the dispatching. However, this will deteriorate the performance of OFDMA system and make the above problem unsolvable.

From searches on academic theses and patent documents and survey of research institutions and companies engaging research of OFDMA system, it is found out that the above problem is seldom focused on and the corresponding solutions are not perfect enough.

SUMMARY OF THE INVENTION

The present invention solves the problem of non-controllability or improper control of carrier transmit power caused by indeterminacy of bandwidth allocation, by providing a method for solving non-controllability of terminal's power spectrum density in OFDMA system to enable each carrier transmit power of the terminal to obtain the best control of the system and optimize the use of power resources of the terminal.

According to the present invention, the method for solving non-controllability of terminal's power spectrum density in OFDMA system comprises the following steps:

1) an AMC module at base station determines the modulation coding method of terminal according to uplink receiving SNR (Signal to Noise Ratio);

2) a power control module at the base station determines carrier transmit power regulating value of the terminal according to the uplink receiving SNR and the modulation coding method determined in step 1);

3) the maximum carrier number that can be allocated to the terminal in this carrier transmit power according to the carrier transmit power regulating value determined in step 2), terminal's carrier transmit power reported by the terminal and terminal's carrier transmit power;

4) a dispatching module allocates uplink time-frequency channel resources to the terminal according to service requirements, the modulation coding method determined in step 1) and the maximum carrier number determined in step 3);

5) the modulation coding method, carrier transmit power regulating value and time-frequency channel resource allocation information are sent to the terminal via downlink link;

6) the terminal regulates power and modulation coding method and sends data according to information sent in step 5).

Preferably, the determination of the maximum carrier number that can be allocated to the terminal in this carrier transmit power in step 3) is performed in the power control module or the dispatching module in the base station side.

Preferably, the Step 1) comprises the following processes:
1.1) calculating uplink receiving SNR;
1.2) determining the modulation coding method of the terminal according to the table of SNR thresholds required by each modulation coding method and the uplink receiving SNR obtained in Step 1.1).

Preferably, the Step 2) comprises the following processes:
2.1) calculating the difference $\Delta CINR$ between the uplink receiving SNR calculated in 1.1) and the SNR threshold corresponding to the modulation coding code determined in 1.2) by comparing them;

$$\Delta CINR = UIUC_{threshold} - CINR_{receive}$$

In the above equation, $CINR_{receive}$ refers to the receiving SNR of the terminal and $UIUC_{threshold}$ refers to the most suitable demodulation SNR threshold corresponding to terminal's modulation coding method determined by AMC module;

2.2) determining the corresponding carrier power regulating value $\Delta PTx$ according to the SNR difference $\Delta CINR$ determined in Step 2.1).

Preferably, step 3) comprises the following processes:

According to the power regulating value $\Delta PTx$ determined in Step 2.2), the reported terminal's carrier transmit power $PTx_{subcarrier}$ and terminal's maximum total transmit power $PTx_{MaxTotal}$, the maximum carrier number that can be allocated to the terminal can be determined in accordance with the following principles:

a) for systems in which each carrier power is the same or the power spectrum densities are the same on each carrier for the terminal, the linear value of the maximum carrier number that can be allocated is represented as:

$$N_{MaxSubcarrierNum} = \frac{PTx_{MaxTotal}}{PTx_{subcarrier} + \Delta PTx}$$

dB value is:

$$N_{MaxSubcarrierNum} = 10^{[PTx_{MaxTotal}(dBm) - (PTx_{subcarrier}(dBm) + \Delta PTx(dB))]/10}$$

b) for the condition of inconstant power spectrum density on each carrier, i.e. the terminal has different power for each carrier, it is calculated by the algorithm in Step a), wherein carrier transmit power $PTx_{subcarrier}$ is estimated through the proportional weighted mean of all kinds of the carrier transmit powers depending on their proportion:

$$PTx_{subcarrier} = \sum_{i=1}^{n} p_i \times PTx_{subcarrier\_i}$$

wherein, $p_i$ is the proportion of the carrier transmit power $PTx_{subcarrier\_i}$ of the $i_{th}$ kind.

Preferably, the determined carrier number needs to guarantee that the carrier number $N_{MaxSubcarrierNum}$ allocated to the terminal should be greater than or equal to the physical carrier number of one channel allocation unit.

Preferably, the Step 4) further comprises the step of regulating the maximum carrier number that can be allocated to the terminal:

In the set carrier transmit power, if the summation of all allocated carrier powers is greater than the maximum total transmit power of the terminal, the carrier number is regulated in accordance with the following principle:

$$N_{SubcarrierNum} = \begin{cases} N_{AllocatedSubCarrierNum}, & N_{AllocatedSubCarrierNum} \leq N_{MaxSubcarrierNum} \\ N_{MaxSubcarrierNum}, & N_{AllocatedSubCarrierNum} > N_{MaxSubcarrierNum} \end{cases}$$

In the above equation, $N_{AllocatedSubCarrierNum}$ represents the carrier number that the dispatching expects to allocate to the terminal without considering whether the carrier power exceeds the maximum total transmit power; $N_{MaxSubcarrierNum}$ represents the maximum carrier number that can be allocated to the terminal in the carrier power set as currently; $N_{SubcarrierNum}$ represents the carrier number actually allocated to the terminal.

Preferably, the power regulation in step 6) comprises the following processes:

When the terminal has close-loop power control, the carrier transmit power of the terminal is regulated according to the power regulating value determined by the base station;

When the terminal has open-loop power control, the carrier transmit power of the terminal is regulated according to the power regulating value determined by the base station and the actual application environment of the terminal.

Preferably, when the terminal has open-loop power control, the step of regulating the carrier number is also included:

A certain margin Margin is set aside from the total transmit power of the terminal, and the maximum carrier number that can be allocated is regulated to be:

$$N_{MaxSubcarrierNum} = \frac{PTx_{MaxTotal} - Margin}{PTx_{subcarrier} + \Delta PTx}$$

in which, $PTx_{subcarrier}$ is the reported carrier transmit power of the terminal and $PTx_{MaxTotal}$ is the maximum total transmit power of the terminal.

Compared with the existing methods of AMC, power control and dispatching, the method of the present invention considers the problem of non-controllability of terminal's carrier transmit power resulting from the indeterminacy of carrier number allocation to the terminal in OFDMA system, and introduces the maximum carrier number that can be allocated to the terminal, by combing AMC, power control and dispatching to solve the problem. By applying the present invention, the carrier power of the terminal can be best controlled by the system, it is most possible for the terminal to transmit power on carrier completely according to the set value, while it is greatly decreased the possibility that the terminal's power spectrum density is suddenly decreased, resulting from that the summation of carrier powers in the set value is greater than the maximum total transmit power. Moreover, occurrence of a large amount of error codes in that condition and waste of power resources resulting from excessive restriction on the carrier power are avoided as well.

Other characteristics and advantages of the present invention will be described in the following specification, and will be apparent partly from the specification and embodiments of the present invention. The objects and other advantages can be realized and obtained through the structure illustrated in the specification, claims, and the drawings.

BRIEF DESCRIPTION OF THE DRAWINGS

The figures illustrated here provide a further understanding of the present invention and constitute a part of the present application. The exemplary embodiments and explanations thereof serve to explain the present invention and are not intended to restrict it. In the figures.

DETAILED DESCRIPTION OF EMBODIMENTS

Figure 1:
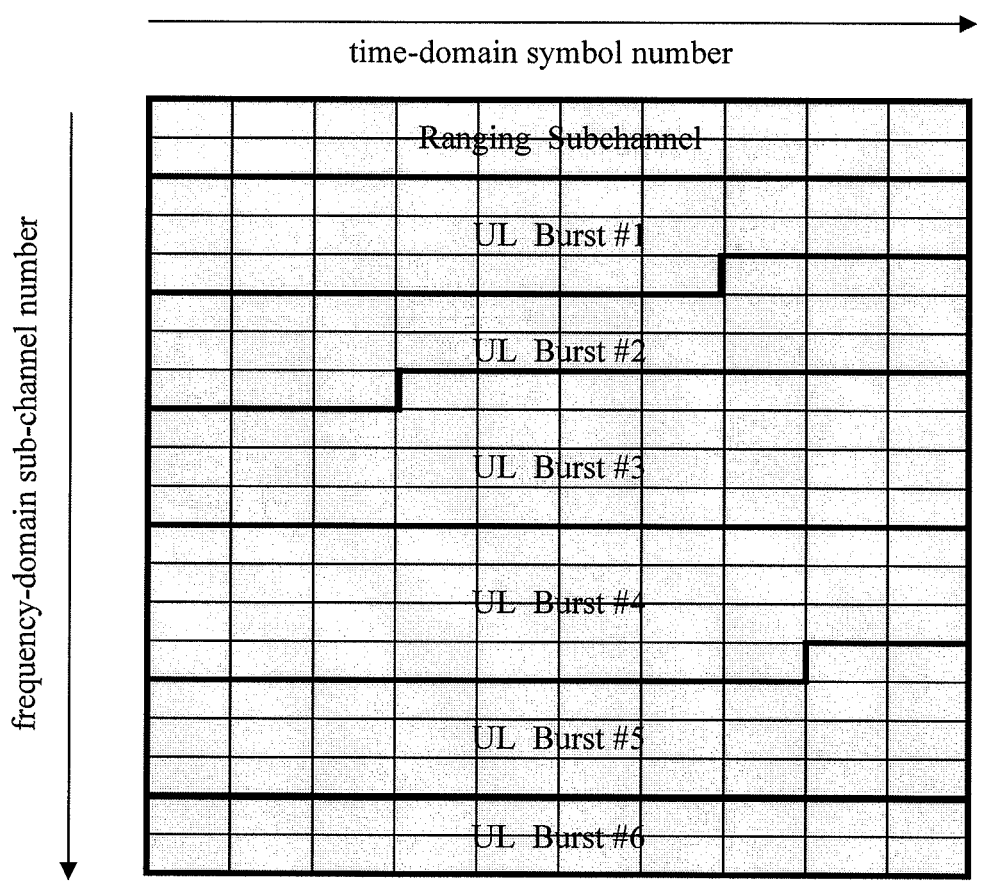
FIG. 1 is a schematic diagram showing the logic structure of uplink frame of the present invention.

As shown in FIG. 1, the present invention adopts the logic structure of uplink frame, wherein each grid represents one time slot (Slot) which is the basic unit of bandwidth allocation and each bold line frame represents a burst (Burst). The occupied bandwidth is different according to different magnitude of data burst. In IEEE 802.16e, the data of one terminal constitutes a burst.

Figure 2:
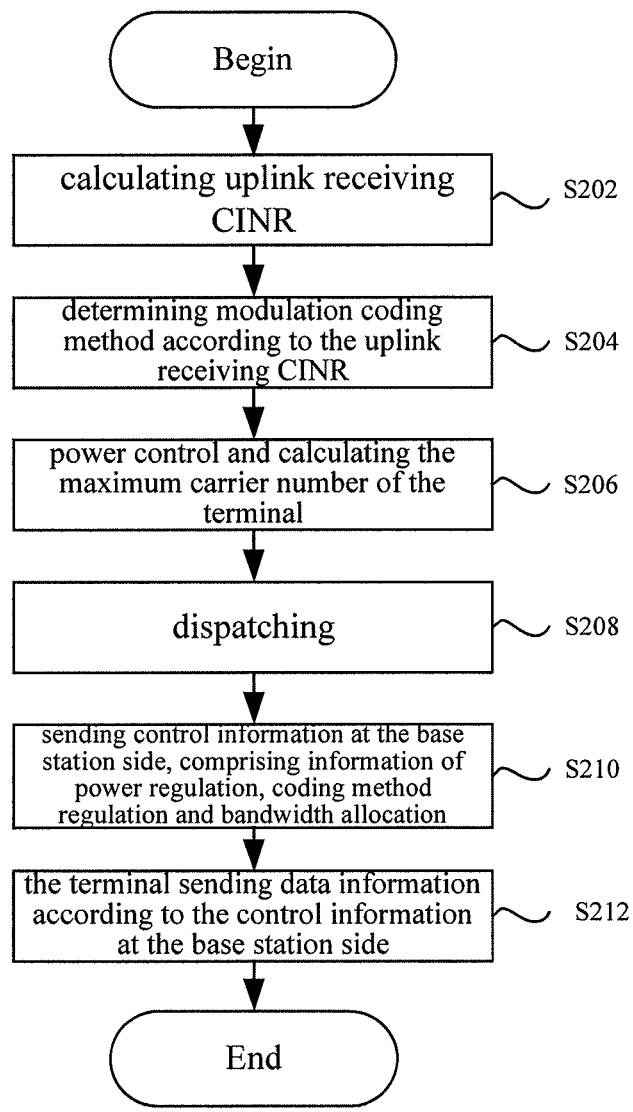
FIG. 2 is a main flow chart of the preferable embodiment of the present invention.

To further understand the present invention, the processing flow of the present invention will be illustrated in detail in combination with FIG. 2 and the embodiment.

Step 202, uplink receiving SNR is first calculated, which may be SNR of uplink pilot or data SNR. There are many methods to calculate SNR, however, they are not the main part of the present invention and will not be illustrated in detail.

Figure 3:
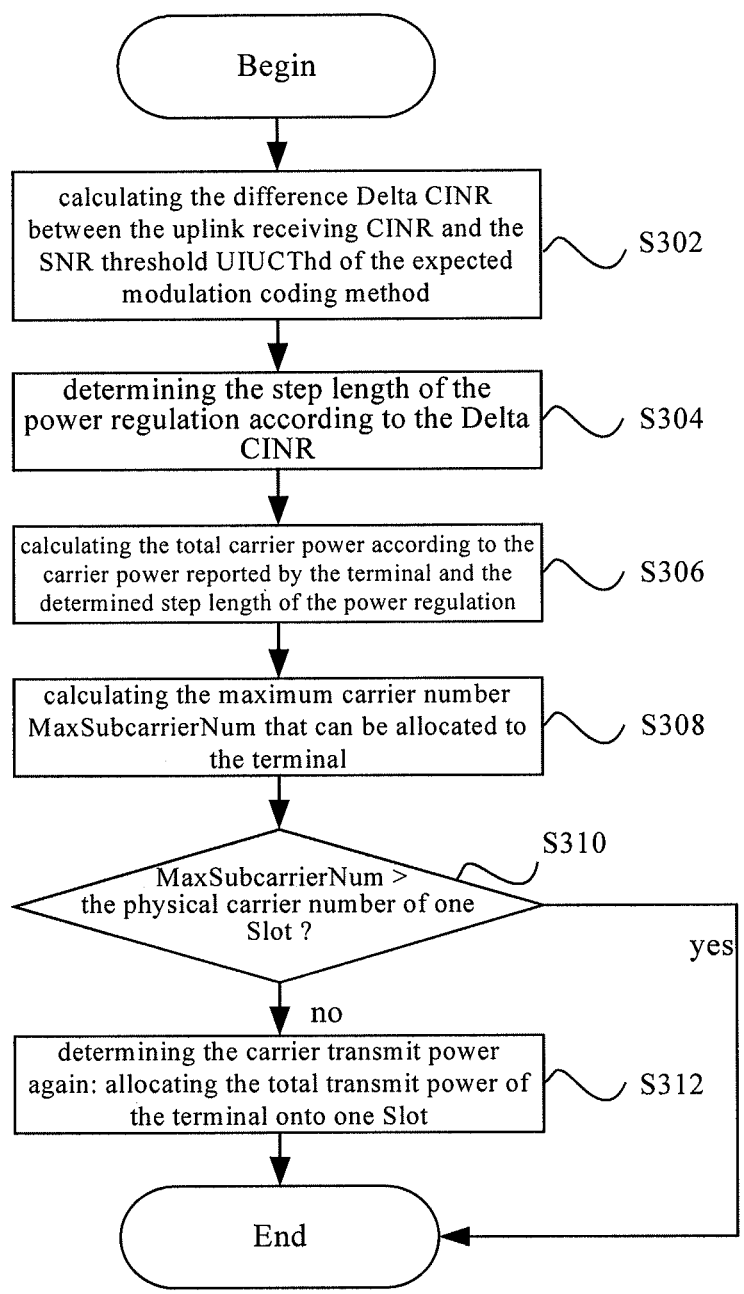
FIG. 3 is a processing flow chart of the power control module of the present invention.

Step 204, AMC: the modulation coding method of the terminal for time sending is determined according to the receiving SNR and the SNR demand threshold of each modulation coding method;

Step 206, power's close-loop control and maximum carrier number that can be allocated are determined as shown in FIG. 3, which comprises steps 302 and 312;

Step 302, difference between the receiving SNR and the optimal demodulation SNR of the expected modulation coding method is calculated as the basis to regulate the power;

Step 304, the close-loop regulating value of the power is determined according to the difference calculated in Step 302;

Step 306, the set value of carrier transmit power after regulation is calculated according to the carrier transmit power reported by the terminal and the carrier power regulating value determined in Step 304;

Step 308, the maximum carrier number that can be allocated to the terminal is calculated according to the maximum total transmit power of the terminal and the set value of the carrier power determined in Step 306

$$N_{MaxSubcarrierNum} = \frac{PTx_{MaxTotal}}{PTx_{subcarrier} + \Delta PTx};$$

Figure 4:
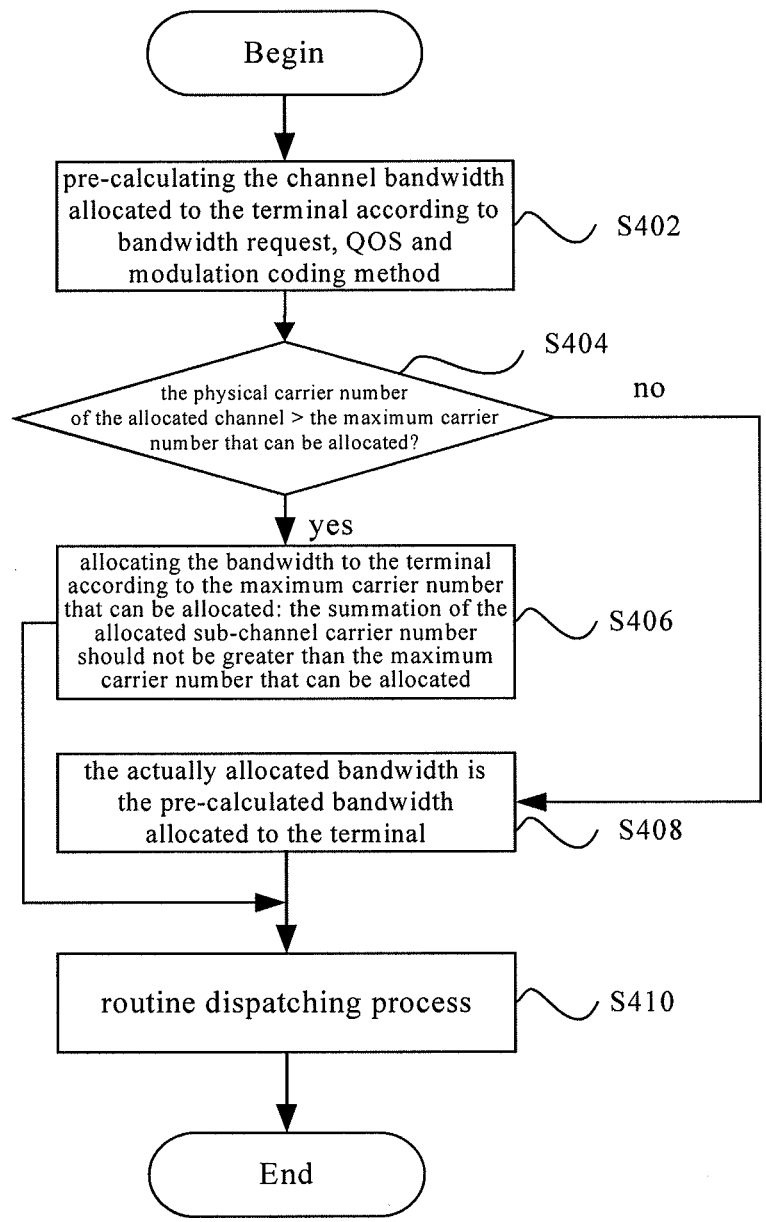
FIG. 4 is a processing flow chart of the dispatching module of the present invention.

Step 310, the maximum carrier number that can be allocated $N_{MaxSubcarrierNum}$ is compared with the physical carrier number of one bandwidth allocation unit (slot). If the former is greater than the latter, the maximum carrier number that can be allocated remains unchanged, directly turning to Step 208; if the former is smaller than the latter, then performing Step 312;

Step 312, the maximum carrier number that can be allocated is the physical carrier number of one bandwidth allocation unit (slot);

Step 208: the dispatching is as shown in FIG. 4, comprising steps 402 to 410;

Step 402, channel bandwidth allocated to the terminal is pre-dispatched according to the bandwidth request, QOS and modulation coding method of the terminal;

Step 404, it is judged whether the maximum physical carrier number in the same time point as the pre-allocated channel is greater than the maximum carrier number that can be allocated which is determined in step 206; if it is greater, then perform Step 406, otherwise perform Step 408;

Step 406, dispatching is performed such that the carrier number actually allocated is equal to the maximum carrier number that can be allocated;

Step 408, dispatching is performed such that the carrier number actually allocated is equal to the carrier number allocated by pre-dispatching;

Step 410, the routine processes of the dispatching are continuously performed which are not illustrated herein as not being the main part of the present invention;

Step 210, as the above Steps 202 to 208 are performed at the base station side, all the control information of the base station must be sent to the terminal via downlink channel. There are various methods to use and different methods can be adopted according to different systems;

Step 212, the terminal makes regulation on the transmit power and modulation coding method according to control information of the base station and sends information on the bandwidth allocated by the dispatching.

The present invention has been illustrated with reference to the above-described embodiments, and it is not to be limited by the above embodiments. It is understood by those skilled in the art various alterations and changes may be made to the present invention within the spirit and scope of the invention. All modifications, substitute equivalents or improvements made therein are intended to be embraced in the claims of this invention.

The invention claimed is:

1. A method for solving non-controllability of OFDMA system terminal's power spectrum density, wherein the method comprises the following steps:
 1) determining, by AMC module at base station side, modulation coding method of a terminal according to uplink receiving SNR (Signal to Noise Ratio);
 2) determining, by a power control module at the base station side, carrier transmit power regulating value of the terminal according to the uplink receiving SNR and the modulation coding method determined in Step 1);
 3) determining a maximum carrier number that can be allocated to the terminal according to the carrier transmit power regulating value determined in Step 2), the terminal's carrier transmit power reported by the terminal, and a maximum total transmit power of the terminal;
 4) allocating, by a dispatching module, uplink time-frequency channel resources to the terminal according to service requirements, the modulation coding method determined in Step 1) and the maximum carrier number determined in Step 3);
 5) sending to the terminal, via downlink link, the modulation coding method determined in Step 1), the carrier transmit power regulating value determined in Step 2), and the uplink time-frequency channel resource allocated in Step 4;
 6) implementing, by the terminal, the carrier transmit power regulating value and the modulation coding method and sending data according to information sent in Step 5).

2. The method for solving non-controllability of terminal's power spectrum density in OFDMA system according to claim 1, wherein the determination of the maximum carrier number that can be allocated to the terminal in the carrier transmit power in Step 3) is performed in the power control module or the dispatching module at the base station side.

3. The method for solving non-controllability of terminal's power spectrum density in OFDMA system according to claim 1, wherein Step 1) comprises the following processes:
 1.1) calculating the uplink receiving SNR;
 1.2) determining the modulation coding method of the terminal according to a table of SNR thresholds required by each modulation coding method and the uplink receiving SNR obtained in Step 1.1).

4. The method for solving non-controllability of terminal's power spectrum density in OFDMA system according to claim 3, wherein Step 2) comprises the following processes:
 2.1) calculating a difference $\Delta CINR$ between the uplink receiving SNR calculated in Step 1.1) and the SNR threshold corresponding to the modulation coding method determined in Step 1.2) by comparing them;

$$\Delta CINR = UIUC_{threshold} - CINR_{receive}$$

in which, $CINR_{receive}$ refers to the receiving SNR of the terminal; and $UIUC_{threshold}$ refers to the most suitable demodulation SNR threshold corresponding to terminal's modulation coding method determined by AMC module;
 2.2) determining the corresponding carrier power regulating value $\Delta PTx$ according to the SNR difference $\Delta CINR$ determined in Step 2.1).

5. The method for solving non-controllability of terminal's power spectrum density in OFDMA system according to claim 4, wherein Step 3) comprises the following processes:
 according to the power regulating value $\Delta PTx$ determined in Step 2.2), the reported terminal's carrier transmit power $PTx_{subcarrier}$ and the terminal's maximum total transmit power $PTx_{MaxTotal}$, the maximum carrier number that can be allocated to the terminal can be determined in accordance with the following principles:
 a) for the system in which the terminal has same power for each carrier or the power spectrum density is the same on each carrier, the linear value of the maximum carrier number that can be allocated is represented as:

$$N_{MaxSubcarrierNum} = \frac{PTx_{MaxTotal}}{PTx_{subcarrier} + \Delta PTx}$$

dB value is:

$$N_{MaxSubcarrierNum} = 10^{[PTx_{MaxTotal}(dBm) - (PTx_{subcarrier}(dBm) + \Delta PTx(dB))]/10}$$

b) in case of unconstant power spectrum density on each carrier, i.e. the terminal has different power for each carrier, it is calculated using the algorithm in Step a), wherein carrier transmit power $PTx_{subcarrier}$ is estimated through the proportional weighted mean of all kinds of the carrier transmit powers upon their proportion:

$$PTx_{subcarrier} = \sum_{i=1}^{n} p_i \times PTx_{subcarrier\_i}$$

wherein, $p_i$ is the proportion of the carrier transmit power $PTx_{subcarrier\_i}$ of the $i_{th}$ kind.

6. The method for solving non-controllability of terminal's power spectrum density in OFDMA system according to claim 5, wherein the determined carrier number needs to guarantee that the carrier number $N_{MaxSubcarrierNum}$ allocated to the terminal should be greater than or equal to the physical carrier number of one channel allocation unit.

7. The method for solving non-controllability of terminal's power spectrum density in OFDMA system according to claim 1, wherein the Step 4) further comprises the step of regulating the maximum carrier number that can be allocated to the terminal:

in the set carrier transmit power, if the summation of all the allocated carrier powers is greater than the maximum total transmit power of the terminal, the carrier number is regulated in accordance with the following principle:

$$N_{SubcarrierNum} = \begin{cases} N_{AllocatedSubCarrierNum}, & N_{AllocatedSubCarrierNum} \leq N_{MaxSubcarrierNum} \\ N_{MaxSubcarrierNum}, & N_{AllocatedSubCarrierNum} > N_{MaxSubcarrierNum} \end{cases}$$

in which, $N_{AllocatedSubCarrierNum}$ represents the carrier number the dispatching expects to allocate to the terminal without considering whether the carrier power exceeds the maximum total transmit power of the terminal; $N_{MaxSubcarrierNum}$ represents the maximum carrier number that can be allocated to the terminal in the carrier power set currently; $N_{SubcarrierNum}$ represents the carrier number actually allocated to the terminal.

8. The method for solving non-controllability of terminal's power spectrum density in OFDMA system according to claim 1, wherein the power regulation in Step 6) comprises the following processes:

when the terminal has close-loop power control, the carrier transmit power of the terminal is regulated according to the power regulating value determined by the base station;

when the terminal has open-loop power control, the carrier transmit power of the terminal is regulated according to the power regulating value determined by the base station and the actual application environment of the terminal.

9. The method for solving non-controllability of terminal's power spectrum density in OFDMA system according to claim 8, wherein when the terminal has the open-loop power control, the step of regulating the carrier number is also included:

a certain margin Margin is set aside from the total transmit power of the terminal, and the maximum carrier number that can be allocated is regulated as:

$$N_{MaxSubcarrierNum} = \frac{PTx_{MaxTotal} - \text{Margin}}{PTx_{subcarrier} + \Delta PTx}$$

in which, $PTx_{subcarrier}$ is the reported carrier transmit power of the terminal and $PTx_{MaxTotal}$ is the maximum total transmit power of the terminal.

* * * * *